United States Patent
Nakamori et al.

(10) Patent No.: US 8,036,427 B2
(45) Date of Patent: Oct. 11, 2011

(54) VEHICLE AND ROAD SIGN RECOGNITION DEVICE

(75) Inventors: Takuma Nakamori, Wako (JP); Sachio Kobayashi, Wako (JP); Tomoyoshi Aoki, Wako (JP); Naoki Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1014 days.

(21) Appl. No.: 11/919,657

(22) PCT Filed: May 18, 2006

(86) PCT No.: PCT/JP2006/309956
§ 371 (c)(1),
(2), (4) Date: Oct. 31, 2007

(87) PCT Pub. No.: WO2006/129492
PCT Pub. Date: Dec. 7, 2006

(65) Prior Publication Data
US 2010/0074469 A1    Mar. 25, 2010

(30) Foreign Application Priority Data
Jun. 3, 2005 (JP) .................... 2005-164763

(51) Int. Cl.
*G06K 9/00* (2006.01)
(52) U.S. Cl. ..................... 382/104; 348/223.1
(58) Field of Classification Search .......... 382/100, 382/103, 104, 181, 190, 195, 199, 203; 348/223.1, 348/655, 690; 702/111; 358/516; 701/23, 701/200, 300, 301
See application file for complete search history.

(56) References Cited

U.S. PATENT DOCUMENTS
6,876,399 B1   4/2005   Masuyama et al.
(Continued)

FOREIGN PATENT DOCUMENTS
JP    05-211654    *    8/1993
(Continued)

OTHER PUBLICATIONS

Mori H et al, "Color impression factor: an image understanding method for outdoor mobile robots", Intelligent Robots and Systems, 1997. IROS '97., Proceedings of the 1997 IEEE/RSJ International Conference on Grenoble, France Sep. 7-11, 1997, New York, NY, USA, IEEE, US, vol. 1, Sep. 7, 1997, pp. 380-387.

(Continued)

*Primary Examiner* — Anand Bhatnagar
(74) *Attorney, Agent, or Firm* — Arent Fox LLP

(57) ABSTRACT

The present invention includes: image capturing means (2) which captures a color image of a road via imaging means (7); area extraction means (3) which extracts areas having a similar color feature value from the captured color image of the road; white balance processing means (5) which performs, for each of the extracted areas, a white balance process of correcting each pixel data in the extracted area so as to reduce the degree of divergence in the level between color components according to a level balance between the color components of the pixel data in the extracted area; and road sign detection means (6) which detects a road sign on the road from the color image subjected to the white balance process. Thus, even if the road illumination state is partially different, it is possible to accurately detect a road sign such as a lane mark from the captured color image of the road via the imaging means such as a camera.

16 Claims, 3 Drawing Sheets

U.S. PATENT DOCUMENTS

| | | | |
|---|---|---|---|
| 7,030,913 B2 * | 4/2006 | Ikeda | 348/223.1 |
| 2002/0101516 A1 * | 8/2002 | Ikeda | 348/223 |
| 2002/0106109 A1 | 8/2002 | Retterath et al. | |
| 2002/0130953 A1 * | 9/2002 | Riconda et al. | 348/115 |
| 2005/0249378 A1 * | 11/2005 | Retterath et al. | 382/104 |
| 2007/0154067 A1 * | 7/2007 | Laumeyer et al. | 382/103 |
| 2008/0133136 A1 * | 6/2008 | Breed et al. | 701/301 |

FOREIGN PATENT DOCUMENTS

| | | | |
|---|---|---|---|
| JP | 09-074516 | * | 3/1997 |
| JP | 11-085999 | * | 3/1999 |
| JP | 2000-030058 | * | 1/2000 |
| JP | 2001-028762 | * | 1/2001 |

OTHER PUBLICATIONS

W.G. Shadeed et al., "Road Traffic Sign Detection in Color Images", ICECS 2003, Proceeding of the 2003 10$^{th}$ IEEE International Conference, vol. 2, ISBN 0-7803-8163-7, 890-893.

* cited by examiner

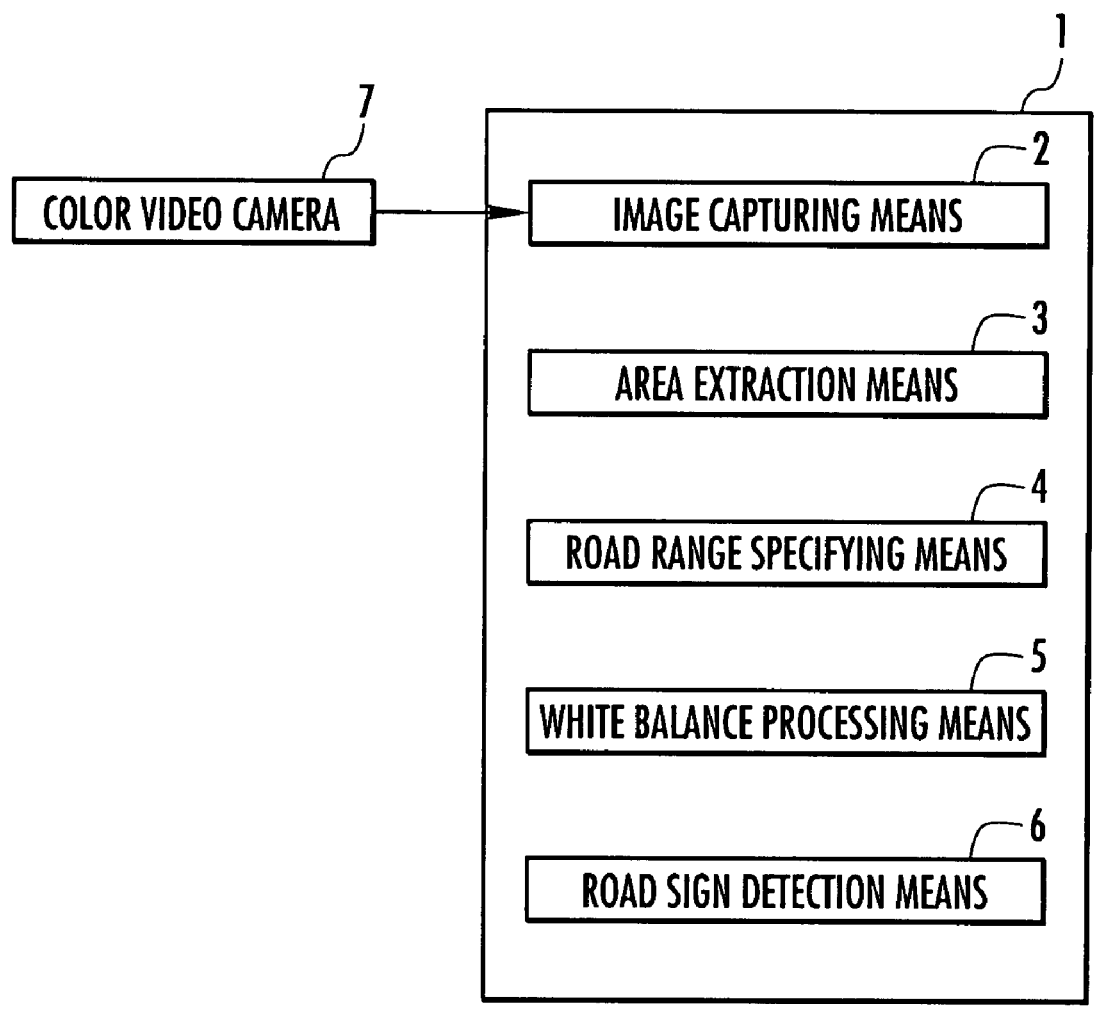

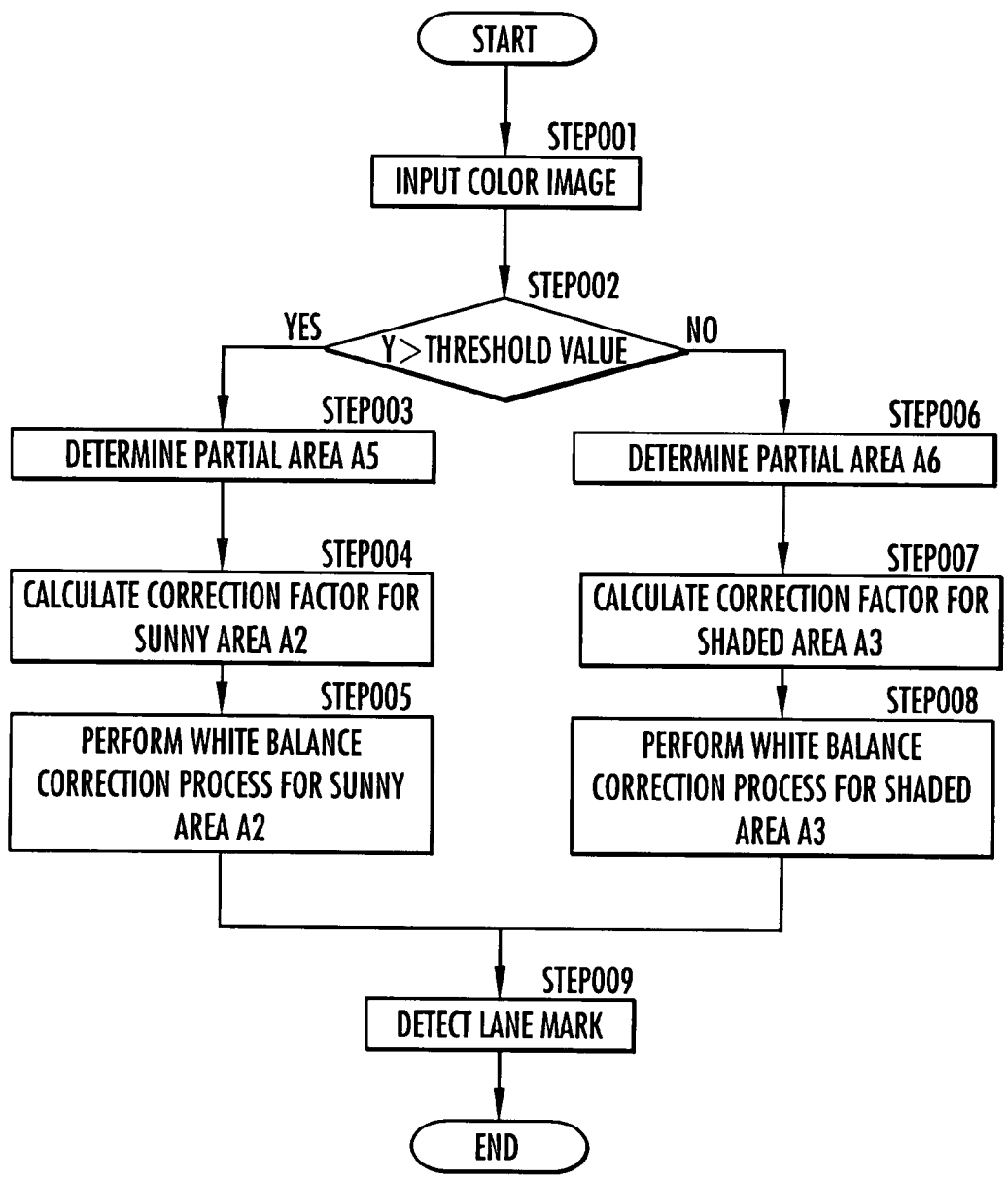

VEHICLE AND ROAD SIGN RECOGNITION DEVICE

CROSS-REFERENCE TO RELATED APPLICATION

This application is a National Stage entry of International Application No. PCT/JP2006/309956, filed May 18, 2006, the entire specification claims and drawings of which are incorporated herewith by reference.

TECHNICAL FIELD

The present invention relates to a vehicle and road sign recognition device for detecting a road sign such as a lane mark on a road by processing an image of the road captured via imaging means such as a camera.

BACKGROUND ART

In recent years, there has been suggested a technology for detecting a lane mark such as a white line on a road such as an express highway by capturing an image of the road along which a vehicle travels with imaging means such as a CCD camera mounted on the vehicle and processing the captured image (for example, refer to Japanese Patent Laid-Open No. Hei 11(1999)-85999 (hereinafter, referred to as Patent Document 1)).

The white line detection device for a vehicle in Patent Document 1 extracts an edge point (negative edge point) where binary data changes from light (white) to dark (black) over the entire image area and an edge point (positive edge point) where binary data changes from dark (black) to light (white) by using a monochrome image (black and white binary image) of a traffic lane obtained by the camera mounted on the vehicle. Then, the white line detection device for a vehicle performs a Hough transform for the positive edge point and the negative edge point independently and combines their Hough transform results to detect a white line.

Furthermore, a road sign (lane mark or traffic sign) other than a white line such as, for example, a yellow line is occasionally used. In this situation, it is difficult to accurately detect the road sign from a monochrome image. Therefore, there has been suggested a technology for detecting a road sign using a color image (for example, refer to Japanese Patent No. 3333468 (hereinafter, referred to as Patent Document 2)).

When a road image is captured by a camera, however, the road may be partially shaded by a building around the road, for example, as shown in FIG. 3(a) or the road may be partially illuminated by the headlights of the vehicle in some cases. If the road image is captured in a situation where the road illumination state is partially different according to the light sources illuminating the road surface or the environment around the road as described above, for example, a shaded area is illuminated only by scattered light and a color feature value of pixel data varies. Therefore, the yellow line located in this area is not recognized as a line having the original yellow color. Accordingly, there has been a problem that it is difficult to appropriately detect a road sign even if a color image is used as in Patent Document 2 in some cases.

DISCLOSURE OF THE INVENTION

Problem to be Solved by the Invention

It is an object of the present invention to solve the above problem and to provide a vehicle and road sign recognition device capable of accurately detecting a road sign such as a lane mark from a color image of a road captured via imaging means such as a camera even if the road illumination state is partially different.

Means to Solve the Problem

To achieve the above object, according to a first aspect of the present invention, there is provided a vehicle comprising: an imaging means; an image capturing means which captures a color image of a road via the imaging means; an area extraction means which extracts areas having a similar color feature value from the captured color image of the road captured by the image capturing means; a white balance processing means which performs, for each of the extracted areas extracted by the area extraction means, a white balance process of correcting each pixel data in the extracted area so as to reduce the degree of divergence in the level between color components according to a level balance between the color components of the pixel data in the extracted area; and a road sign detection means which detects a road sign on the road from the color image subjected to the white balance process.

Moreover, according to the first aspect of the present invention, there is provided a road sign recognition device comprising: an image capturing means which captures a color image of a road via an imaging means; an area extraction means which extracts areas having a similar color feature value from the captured color image of the road captured by the image capturing means; a white balance processing means which performs, for each of the extracted areas extracted by the area extraction means, a white balance process of correcting each pixel data in the extracted area so as to reduce the degree of divergence in the level between color components according to a level balance between the color components of the pixel data in the extracted area; and a road sign detection means which detects a road sign on the road from the color image subjected to the white balance process.

According to the vehicle and road sign recognition device of the first aspect of the present invention, the area extraction means extracts areas having a color feature value from the color image of the road. Note that sometimes there is an area where the road illumination state is different according to the light sources illuminating the road surface or the environment around the road. In this situation, the areas have a similar color feature value that can be specified according to the brightness, saturation, hue, or the like. Therefore, the area extraction means can extract the areas in a divided manner from the color image by extracting the areas having the similar color feature value. Thereby, for example, if a road is partially shaded by a building around the road, the area extraction means can extract shaded areas in a divided manner from the road color image captured by the image capturing means.

Note that areas of different illumination states in the color image are different in the level balance (white balance) between the color components of the pixel data. Thus, in some cases it may be difficult to recognize the color of the road sign to be detected due to a bias in the level between the color components depending on an area. Therefore, the white balance processing means performs, for each of the extracted areas, the white balance process of correcting each pixel data in the extracted area so as to reduce the degree of divergence in the level between the color components according to the level balance between the color components of the pixel data in the extracted area. Thereby, the white balance processing means can decrease the degree of bias in the level between the color components for each of the areas different in the illumination state. For example, since a shaded area is illuminated only by scattered light and thus has a blue tinge, the level balance between the color components in the pixel data is different from that in the area which is not tinged with blue. In this instance, each pixel data is corrected so as to reduce the effect of the added tinge of color by the white balance process. Then, the road sign detection means detects the road sign on the road from the color image subjected to the white balance process and therefore the road sign can be accurately detected even if the illumination state of the captured road is partially different.

Furthermore, in the vehicle and road sign recognition device according to the first aspect of the present invention, the color components of each pixel data of the color image consist of R, G, and B values, and the white balance processing means performs processing of multiplying the R value by a first correction factor calculated based on a ratio between a general level of the R value in the extracted area and a general level of a luminance value calculated from the color components in the extracted area, multiplying the G value by a second correction factor calculated based on a ratio between a general level of the G value in the extracted area and a general level of the luminance value calculated from the color components in the extracted area, and multiplying the B value by a third correction factor calculated based on a ratio between a general level of the B value in the extracted area and a general level of the luminance value calculated from the color components in the extracted area for each pixel data in the extracted area in the white balance process.

According thereto, the white balance processing means calculates the first correction factor based on the ratio between the general level of the R value in the extracted area and the general level of the luminance value calculated from the color components in the extracted area, calculates the second correction factor based on the ratio between the general level of the G value in the extracted area and the general level of the luminance value calculated from the color components in the extracted area, and calculates the third correction factor based on the ratio between the general level of the B value in the extracted area and the general level of the luminance value calculated from the color components in the extracted area. Thereby, as the general level of the R value in the extracted area is higher than the luminance value in the extracted area, the calculated first correction factor is weighted in such a way that the R value is smaller. The second and third correction factors are calculated similarly for the G and B values. Therefore, the correction factors are calculated in such a way as to be weighted to reduce the degree of divergence in the general level between the R, G, and B values without a change in the general level of the luminance value in the area.

Then, the white balance processing means corrects the R value of each pixel in the extracted area using the first correction factor, corrects the G value using the second correction factor, and corrects the B value using the third correction factor. Therefore, the white balance processing means can correct the R, G, and B values of each pixel so as to reduce the degree of divergence in the general level between the R, G, and B values. For example, if the area is tinged with blue as a whole because the shaded area is illuminated only by scattered light, the B value is high in comparison with the R and G values. In this instance, the pixel data is corrected by the white balance process so that the B value is lower and the R and G values are higher according to the balance between the general R, G, and B values, by which the blue tinge is removed from the area. Therefore, the white balance processing means can approximate the color tinged with blue of the road sign to the original color so as to facilitate the detection of the road sign by the road sign detection means.

In this condition, in the vehicle and road sign recognition device according to the first aspect of the present invention, the white balance processing means uses a sum value of R values of all pixels in the extracted area as the general level of the R value in the extracted area and uses a sum value of luminance values of all pixels in the extracted area as the general level of the luminance value calculated from the color components in the extracted area in the case where calculating the first correction factor, the white balance processing means uses a sum value of G values of all pixels in the extracted area as the general level of the G value in the extracted area and uses a sum value of luminance values of all pixels in the extracted area as the general level of the luminance value calculated from the color components in the extracted area in the case where calculating the second correction factor, and the white balance processing means uses a sum value of B values of all pixels in the extracted area as the general level of the B value in the extracted area and uses a sum value of luminance values of all pixels in the extracted area as the general level of the luminance value calculated from the color components in the extracted area in the case where calculating the third correction factor.

Alternatively, in the vehicle and road sign recognition device according to the first aspect of the present invention, the white balance processing means uses a mean value of R values of all pixels in the extracted area as the general level of the R value in the extracted area and uses a mean value of luminance values of all pixels in the extracted area as the general level of the luminance value calculated from the color components in the extracted area in the case where calculating the first correction factor, the white balance processing means uses a mean value of G values of all pixels in the extracted area as the general level of the G value in the extracted area and uses a mean value of luminance values of all pixels in the extracted area as the general level of the luminance value calculated from the color components in the extracted area in the case where calculating the second correction factor, and the white balance processing means uses a mean value of B values of all pixels in the extracted area as the general level of the B value in the extracted area and uses a mean value of luminance values of all pixels in the extracted area as the general level of the luminance value calculated from the color components in the extracted area in the case where calculating the third correction factor.

According thereto, the white balance processing means uses the sum or mean value of all pixels of the R, G, B, and luminance values in the extracted area when calculating the first correction factor, the second correction factor, and the third correction factor. Note that each of the sum and mean values represents the general level of the R, G, B, or luminance value in the extracted area. Therefore, the correction factors are calculated so as to reduce the degree of divergence in the level of the R, G, and B values in the area on the basis of the general levels of the R, G, B, and luminance values in the extracted area. Accordingly, the white balance processing means can appropriately correct the level balance between the color components of the area.

Subsequently, according to a second aspect of the present invention, there is provided a vehicle comprising: an imaging means; an image capturing means which captures a color image of a road via the imaging means; an area extraction means which extracts areas having a similar color feature value from the captured color image of the road captured by the image capturing means; a road range specifying means which specifies a road range that the road occupies in the color image; a white balance processing means which performs, for each of the extracted areas extracted by the area extraction means, a white balance process of correcting each pixel data in the extracted area so as to reduce the degree of divergence in the level between color components according to a level balance between the color components of the pixel data in the road range of the extracted area; and a road sign detection means which detects a road sign on the road from the color image subjected to the white balance process.

Furthermore, according to the second aspect of the present invention, there is provided a road sign recognition device comprising: an image capturing means which captures a color image of a road via an imaging means; an area extraction means which extracts areas having a similar color feature value from the captured color image of the road captured by the image capturing means; a road range specifying means which specifies a road range that the road occupies in the color image; a white balance processing means which performs, for each of the extracted areas extracted by the area extraction means, a white balance process of correcting each pixel data in the extracted area so as to reduce the degree of divergence in the level between color components according to a level balance between the color components of the pixel data in road range of the extracted area; and a road sign detection means which detects a road sign on the road from the color image subjected to the white balance process.

According to the vehicle and road sign recognition device of the second aspect of the present invention, exactly alike the vehicle and road sign recognition device according to the first aspect, the area extraction means extracts areas having a similar color feature value from the color image of the road. Therefore, the area extraction means can extract areas in a divided manner from the color image by extracting the areas having the similar color feature value if there is an area where the road illumination state is different in the color image of the road. Thereby, for example, if a road is partially shaded by a building around the road, the area extraction means can extract shaded areas in a divided manner from the road color image captured by the image capturing means.

Note that the level balance (white balance) between the color components of the pixel data is different between areas of different illumination states in the color image. In some cases, it is difficult to recognize the color of the road sign to be detected due to a bias in the level between the color components depending on an area. Therefore, the road range specifying means specifies the road range in the color image. The white balance processing means then performs, for each of the extracted areas, the white balance process of correcting each pixel data in the extracted area so as to reduce the degree of divergence in the level between the color components according to the level balance between the color components of the pixel data in the road range of the extracted area. In this condition, in the image portions other than the road range, various objects around the road are captured and therefore it is assumed that there are wide variations among the color feature values. On the other hand, in the image portions within the road range, a paved road occupies the most part of the image and it is considered that there are only a few color variations on the road, and therefore it is assumed that there are less variations among the color feature values in the road range.

Accordingly, the white balance processing means can decrease the degree of bias in the level between the color components for each of the areas different in the illumination state by eliminating the effect of the pixel data in the portions other than the road range of the color image by correcting each pixel data in the extracted area so as to reduce the degree of divergence in the level between the color components according to the balance between the color components of the pixel data in the road range with less variations among the color feature values. Therefore, the white balance processing means can correct the level balance between the color components in the road sign more stably. For example, since the shaded area is illuminated only by scattered light and thus has a blue tinge, the level balance between the color components in the pixel data is different from that in the area which is not tinged with blue. In this instance, each pixel data is corrected so as to reduce the effect of the added tinge of color by the white balance process. Then, the road sign detection means detects the road sign on the road from the color image subjected to the white balance process and therefore the road sign can be accurately detected even if the illumination state of the captured road is partially different.

Furthermore, in the vehicle and road sign recognition device according to the second aspect of the present invention, the color components of each pixel data of the color image consist of R, G, and B values; and the white balance processing means performs processing of multiplying the R value by a first correction factor calculated based on a ratio between a general level of the R value in the road range of the extracted area and a general level of a luminance value calculated from the color components in the road range of the extracted area, multiplying the G value by a second correction factor calculated based on a ratio between a general level of the G value in the road range of the extracted area and a general level of the luminance value calculated from the color components in the road range of the extracted area, and multiplying the B value by a third correction factor calculated based on a ratio between a general level of the B value in the road range of the extracted area and a general level of the luminance value calculated from the color components in the road range of the extracted area for each pixel data in the extracted area in the white balance process.

According thereto, the white balance processing means calculates the first correction factor based on the ratio between the general level of the R value in the road range of the extracted area and the general level of the luminance value calculated from the color components in the road range of the extracted area, calculates the second correction factor based on the ratio between the general level of the G value in the road range of the extracted area and the general level of the luminance value calculated from the color components in the road range of the extracted area, and calculates the third correction factor based on the ratio between the general level of the B value in the road range of the extracted area and the general level of the luminance value calculated from the color components in the road range of the extracted area. Thereby, similarly to the vehicle and road sign recognition device according to the first aspect of the present invention, as the general level of the R value in the road range of the extracted area is higher than the luminance value in the road range of the extracted area, the calculated first correction factor is weighted in such a way that the R value is smaller. The second and third correction factors are calculated similarly for the G and B values. Therefore, the correction factors are calculated in such a way as to be weighted to reduce the degree of divergence in the general level between the R, G, and B values without a change in the general level of the luminance value in the road range of the area.

Then, the white balance processing means corrects the R value of each pixel in the extracted area using the first correction factor, corrects the G value using the second correction factor, and corrects the B value using the third correction factor. Therefore, similarly to the vehicle and road sign recognition device according to the first aspect of the present invention, the white balance processing means can correct the R, G, and B values of each pixel so as to reduce the degree of divergence in the general level between the R, G, and B values. For example, if the area is tinged with blue as a whole because the shaded area is illuminated only by scattered light, the B value is high in comparison with the R and G values. In this instance, the pixel data is corrected by the white balance process so that the B value is lower and the R and G values are higher according to the balance between the general R, G, and B values, by which the blue tinge is removed from the area. Therefore, the white balance processing means can approximate the color tinged with blue of the road sign to the original color so as to facilitate the detection of the road sign by the road sign detection means.

In this condition, in the vehicle and road sign recognition device according to the second aspect of the present invention, the white balance processing means uses a sum value of R values of all pixels in the road range of the extracted area as the general level of the R value in the road range of the extracted area and uses a sum value of luminance values of all pixels in the road range of the extracted area as the general level of the luminance value calculated from the color components in the road range of the extracted area in the case where calculating the first correction factor; the white balance processing means uses a sum value of G values of all pixels in the road range of the extracted area as the general level of the G value in the road range of the extracted area and uses a sum value of luminance values of all pixels in the road range of the extracted area as the general level of the luminance value calculated from the color components in the road range of the extracted area in the case where calculating the second correction factor; and the white balance processing means uses a sum value of B values of all pixels in the road range of the extracted area as the general level of the B value in the road range of the extracted area and uses a sum value of luminance values of all pixels in the road range of the extracted area as the general level of the luminance value calculated from the color components in the road range of the extracted area in the case where calculating the third correction factor.

Alternatively, in the vehicle and road sign recognition device according to the second aspect of the present invention, the white balance processing means uses a mean value of R values of all pixels in the road range of the extracted area as the general level of the R value in the road range of the extracted area and uses a mean value of luminance values of all pixels in the road range of the extracted area as the general level of the luminance value calculated from the color components in the road range of the extracted area in the case where calculating the first correction factor; the white balance processing means uses a mean value of G values of all pixels in the road range of the extracted area as the general level of the G value in the road range of the extracted area and uses a mean value of luminance values of all pixels in the road range of the extracted area as the general level of the luminance value calculated from the color components in the road range of the extracted area in the case where calculating the second correction factor; and the white balance processing means uses a mean value of B values of all pixels in the road range of the extracted area as the general level of the B value in the road range of the extracted area and uses a mean value of luminance values of all pixels in the road range of the extracted area as the general level of the luminance value calculated from the color components in the road range of the extracted area in the case where calculating the third correction factor.

According thereto, the white balance processing means uses the sum or mean value of all pixels of the R, G, B, and luminance values in the road range of the extracted area when calculating the first correction factor, the second correction factor, and the third correction factor. Note that each of the sum and mean values represents the general level of the R, G, B, or luminance value in the road range of the extracted area. Therefore, the correction factors are calculated so as to reduce the degree of divergence in the level of the R, G, and B values in the road range of the area on the basis of the general levels of the R, G, B, and luminance values in the road range of the extracted area. Accordingly, the white balance processing means can appropriately correct the level balance between the color components of the area.

BRIEF DESCRIPTION OF THE DRAWINGS

FIG. 1 is a functional block diagram of a road sign recognition device according to a first embodiment of the present invention;

FIG. 2 is a flowchart showing a road sign recognition process of the road sign recognition device in FIG. 1.

BEST MODE FOR CARRYING OUT THE INVENTION

Figure 3A:
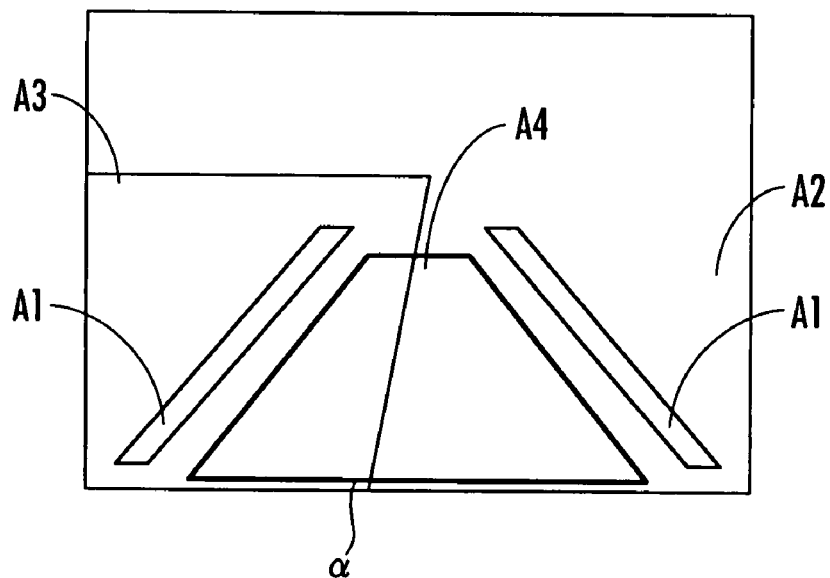
FIG. 3 is an illustrative diagram of a processed image in the road sign recognition process of the road sign recognition device in FIG. 1.
Figure 3B:
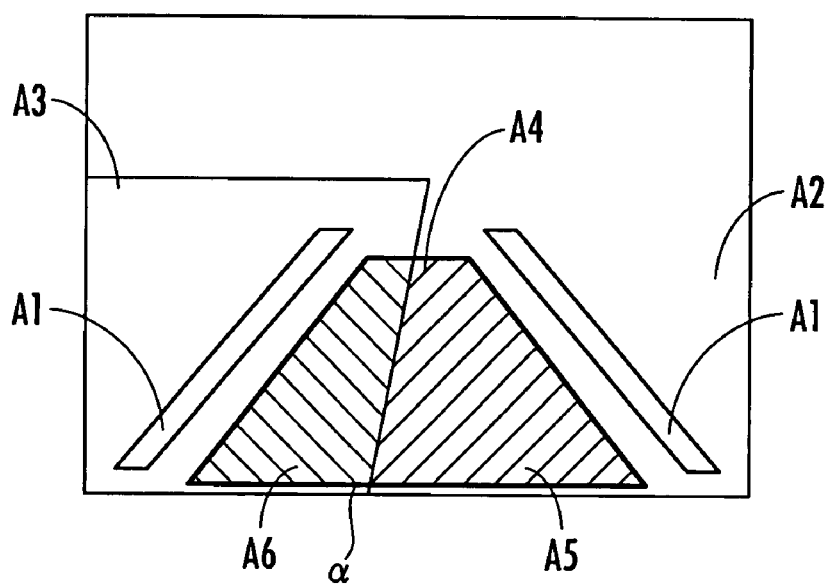

A preferred embodiment of the present invention will be described below with reference to the accompanying drawings. FIG. 1 shows a functional block diagram of a road sign recognition device according to a first embodiment of the present invention. FIG. 2 shows a flowchart of a road sign recognition process of the road sign recognition device in FIG. 1. FIGS. 3(*a*) and 3(*b*) each show an illustrative diagram of a processed image of the road sign recognition process of the road sign recognition device in FIG. 1. The first embodiment corresponds to the second aspect of the present invention.

Referring to FIG. 1, the road sign recognition device 1 is an electronic unit composed of a microcomputer and the like and is mounted on a vehicle, including an image capturing means 2 which captures a color image of a road, an area extraction means 3 which extracts areas having a similar color feature value from the captured color image, a road range specifying means 4 which specifies a road range in the color image of the road, a white balance processing means 5 which performs a white balance process for each of the extracted areas, and a road sign detection means 6 which detects a road sign from the color image subjected to the white balance process.

The image capturing means 2 captures a road color image composed of pixel data via a color video camera 7 (the imaging means of the present invention such as a CCD camera) which is attached to the front of the vehicle to capture the image in front of the vehicle. Note that the color components of the pixel data of the captured color image consist of R, G, and B values. The vehicle of the present invention is equipped with the color video camera 7 and the road sign recognition device 1.

The area extraction means 3 extracts areas having a similar color feature value from the road color image captured by the image capturing means 2 and divides the color image into one or more areas. The area extraction means 3 uses a luminance value Y calculated from the color components of the pixel data as a color feature value.

The road range specifying means 4 specifies a road range in the color image of the road captured by the image capturing means 2. The road range is previously determined on the assumption that the road occupies the range in the color image.

The white balance processing means 5 calculates correction factors for use in correcting a level balance between color components in the area extracted by the area extraction means 3 from pixel data included in the road range specified by the road range specifying means 4 in the extracted area. The correction factors are specifically a first correction factor WR for correcting the R value of the pixel data, a second correction factor WG for correcting the G value, and a third correction factor for correcting the B value. The white balance processing means 5 multiplies the R value by WR, the G value by WG, and the B value by WB to correct the level balance between the color components in the area.

The road sign detection means 6 detects a lane mark (corresponding to a road sign of the present invention) from the color image subjected to the process by the white balance processing means 5. The road sign detection means 6 can use a general technique as disclosed in Patent Document 1 or 2 as a technique of detecting the lane mark.

The operation of the road sign recognition device 1 of this embodiment will be described below according to the flowchart shown in FIG. 2. The following describes the operation by giving an example in which an area in the sun (sunny area A2) exists concurrently with an area in the shadow (shaded area A3) in the color image of the road as shown in FIGS. 3(*a*) and 3(*b*). A lane mark A1 having a given color (yellow or the like) in FIG. 3(*a*) or 3(*b*) is an object to be detected by the road sign recognition device 1.

First, the image capturing means 2 captures the color image of the road composed of pixel data by inputting a video signal output from the color video camera 7. Each pixel of the captured color image of the road has color components of the R, G, and B values (step 001).

Subsequently, the area extraction means 3 determines whether or not the luminance value Y of each pixel of the captured color image is equal to or higher than a given threshold value (step 002). The luminance value Y used here is calculated by an equation Y=(R+G×2+B)/4. If the luminance value Y of the pixel is equal to or higher than the threshold value as a result of the determination in step 002, the pixel is considered to be included in the sunny area A2, and otherwise the pixel is considered to be included in the shaded area A3. Thereby, the area extraction means 3 can divide the color image into the sunny area A2 and the shaded area A3 as shown in FIG. 3(*a*).

Subsequently, the white balance processing means 5 performs the white balance process for the sunny area A2 and the shaded area A3. First, the white balance processing means 5 performs the white balance process for the sunny area A2 in steps 003 to 005.

The white balance processing means 5 determines a partial area A5 contained in a road range A4 previously specified in the color image by the road range specifying means 4 in the sunny area A2 in step 003. In FIGS. 3(*a*) and 3(*b*), the road range A4 is set to a range enclosed by a solid line α. The road range A4 is set assuming a range including only a road in the color image. In FIG. 3(*b*), the partial area A5 is an overlap between the sunny area A2 and the road range A4. In step 004, the white balance processing means 5 calculates a white balance correction factor for the sunny area A2 according to a level balance between color components of pixel data in the partial area A5. Thereby, the correction factors WR, WG, WB are calculated using only pixel data in the road range A4, which is steady in the color feature value.

In step 004, the white balance processing means 5 calculates sum values Rsum, Gsum, Bsum, and Ysum of the R value, G value, B value, and luminance value Y of each pixel data in the partial area A5. Note that the sum values Rsum, Gsum, Bsum, and Ysum indicate the general levels of the R value, G value, B value, and luminance value Y in the partial area A5, respectively. Then, the white balance processing means 5 calculates the correction factors WR, WG, and WB according to the following equation (1).

$$WR = Y\text{sum}/R\text{sum}, \ WG = Y\text{sum}/G\text{sum}, \ WB = Y\text{sum}/B\text{sum} \qquad (1)$$

This allows the calculation of the correction factors WR, WG, and WB for the sunny area A2 weighted so as to reduce the degree of divergence in the general level between the R, G, and B values in the partial area A5.

Next, in step 005, the white balance processing means 5 corrects the pixel data in the sunny area A2 by multiplying the R, G, and B values of each pixel data in the sunny area A2 by the calculated correction factors WR, WG, and WB for the sunny area A2. This reduces the bias in the level between the color components in the sunny area A2.

Subsequently, the white balance processing means 5 performs the white balance process for the shaded area A3 in steps 006 to 008. Note that the white balance process for the shaded area A3 can also be performed earlier than the white balance process for the sunny area A2 described above.

First, in step 006, the white balance processing means 5 determines a partial area A6, which is included in the road range A4, out of the shaded area A3. In FIG. 3(*b*), the partial area A6 is an overlap between the shaded area A3 and the road range A4. Then, in step 007, the white balance processing means 5 calculates the correction factors WR, WG, and WB of the white balance for the shaded area A3 according to the level balance between the color components of the pixel data in the partial area A6. This allows the calculation of the correction factors WR, WG, and WB using only the pixel data in the road range A4, which is steady in the color feature value, similarly to the sunny area A2.

In step 007, the white balance processing means 5 calculates the sum values Rsum, Gsum, Bsum, and Ysum of the R value, G value, B value, and luminance value Y of each pixel data in the partial area A6. Note that the sum values Rsum, Gsum, Bsum, and Ysum indicate the general levels of the R value, G value, B value, and luminance value Y in the partial area A6, respectively. Then, the white balance processing means 5 calculates the correction factors WR, WG, and WB according to the above equation (1), similarly to step 004. This allows the calculation of the correction factors WR, WG, and WB for the shaded area A3 weighted so as to reduce the degree of divergence in the general level between the R, G, and B values in the partial area A6, similarly to the sunny area A2.

Next, in step 008, the white balance processing means 5 corrects the pixel data in the shaded area A3 by multiplying the R, G, and B values of each pixel data in the shaded area A3 by the calculated correction factors WR, WG, and WB for the shaded area A3, respectively. This reduces the bias in the level between the color components in the shaded area A3.

Next, in step 009, the road sign detection means 6 performs a process of detecting a lane mark for the image subjected to the white balance process. The bias in the level between the color components in each of the sunny area A2 and the shaded area A3 is reduced by the white balance process in the above steps 005 and 008, by which correction is made in the difference in the level balance between the color components between the pixel data in the sunny area A2 and the pixel data in the shaded area A3, and therefore the road sign detection means 6 can detect the lane mark A1 having the given color (yellow or the like) accurately.

According to the above processes, the road sign recognition device 1 can detect the lane mark A1 accurately from the road color image captured by the color video camera 7 even if the road illumination state is partially different.

Although the road sign recognition device 1 includes the road range specifying means 4 in the first embodiment, it is also possible to omit the road range specifying means 4 and allow the white balance processing means 5 to use pixel data of the entire area extracted by the area extraction means 3 when calculating the correction factors WR, WG, and WB as a second embodiment (it corresponds to the first aspect of the present invention).

According to the above, the white balance processing means 5 uses the sum values Rsum', Gsum', Bsum', and Ysum' of the R value, G value, B value, and luminance value Y of each pixel data calculated for the sunny area A2 and the shaded area A3, instead of using the sum values Rsum, Gsum, Bsum, and Ysum of the R value, G value, B value, and luminance value Y of each pixel data calculated for the partial area A5 and the partial area A6, when calculating the correction factors WR, WG, and WB (steps 004 and 007 in FIG. 2 of the first embodiment). Note that the sum values Rsum', Gsum', Bsum', and Ysum' indicate the general levels of the R value, G value, B value, and luminance value Y, respectively, in the sunny area A2 and the shaded area A3.

Also in this case, the bias in the level between the color components in each of the sunny area A2 and the shaded area A3 is reduced by the white balance process in the above steps 005 and 008, which thereby corrects the difference in the level balance between the color components between the pixel data in the sunny area A2 and the pixel data in the shaded area A3, and therefore the road sign detection means 6 can detect the lane mark A1 having the given color (yellow or the like) accurately. Accordingly, the road sign recognition device according to this embodiment provides the same operation and effect as the embodiment in which the road sign recognition device 1 includes the road range specifying means 4.

Moreover, although the image capturing means 2 captures a color image whose pixel data includes the color components of the R, G, and B values in the first and second embodiments, it is also possible to use CMY output as color components of the pixel data.

Furthermore, the area extraction means 3 can calculate the luminance value Y according to $Y=\alpha \times R+\beta \times G+\gamma \times B$ when extracting areas having a similar color feature value in the first and second embodiments (step 002 in FIG. 2 in the first embodiment). Note that $\alpha$, $\beta$, and $\gamma$ are given coefficients satisfying $\alpha+\beta+\gamma=1$. Alternatively, the area extraction means 3 can calculate the luminance value Y according to $Y=(Max+Min)/2$ using the maximum value Max and the minimum value Min among the R, G, and B values. Alternatively, the area extraction means 3 can use the G value as the luminance value Y.

Moreover, in the first and second embodiments, the area extraction means 3 can use a saturation value S or a hue value H calculated from the color components of the pixel data as a color feature value, instead of using the luminance value Y, when extracting the areas having the similar color feature value (step 002 in FIG. 2 in the first embodiment). Alternatively, the area extraction means 3 can use a combination of a plurality of elements selected out of the luminance value Y, the saturation value S, and the hue value H as the color feature value. For example, if the hue value H is used as the color feature value, the area extraction means 3 determines whether or not the hue value H of each pixel of the color image is equal to or higher than a given threshold value. In this case, the shaded area A3 is different in color from the sunny area A2 due to an added tinge of color though the light is blocked there, and therefore the area extraction means 3 can extract the sunny area A2 and the shaded area A3 similarly to the case of using the luminance value Y by dividing the area by a given threshold value using the hue value H.

Furthermore, in the first embodiment, the white balance processing means 5 can use mean values Rmed, Gmed, Bmed, and Ymed in the partial area A5 and the partial area A6, instead of using the sum values Rsum, Gsum, Bsum, and Ysum in the partial area A5 and the partial area A6, when calculating the correction factors WR, WG, and WB (steps 004 and 007 in FIG. 2 in the first embodiment). In this instance, the mean values Rmed, Gmed, Bmed, and Ymed also indicate the general levels of the R, G, and B values and the luminance value Y in the partial area A5 and the partial area A6, respectively. Therefore, the white balance processing means 5 can calculate the correction factors WR, WG, and WB so as to reduce the degree of divergence in the level between the R, G, and B values in the partial area A5 and the partial area A6, similarly to the case of using the sum values Rsum, Gsum, Bsum, and Ysum.

Furthermore, in the second embodiment, the white balance processing means 5 can use mean values Rmed', Gmed', Bmed', and Ymed' in the sunny area A2 and the shaded area A3, instead of using the sum values Rsum', Gsum', Bsum', and Ysum' in the sunny area A2 and the shaded area A3, when calculating the correction factors WR, WG, and WB. In this instance, the mean values Rmed', Gmed', Bmed', and Ymed' also indicate the general levels of the R, G, and B values and the luminance value Y in the sunny area A2 and the shaded area A3, respectively. Therefore, the white balance processing means 5 can calculate the correction factors WR, WG, and WB so as to reduce the degree of divergence in the level between the R, G, and B values in the sunny area A2 and the shaded area A3, similarly to the case of using the sum values Rsum', Gsum', Bsum', and Ysum'.

Moreover, in the first and second embodiments, the road sign recognition device can include an external sensor such as a spectrometer, so that the white balance processing means 5 can calculate the correction factors WR, WG, and WB from the detection result of the external sensor at a predetermined detection point ahead of the vehicle, instead of calculating the correction factors WR, WG, and WB from the pixel data of the color image, in the white balance process.

Furthermore, although the road sign recognition device detects the yellow line as a road sign in the first and second embodiments, the effect of the present invention can be achieved also when other types of lane marks (Botts Dots, cat's eye, and the like), traffic signs, and the like are to be detected.

INDUSTRIAL APPLICABILITY

The present invention, as described above, is adapted for use in giving information to the driver in the vehicle or controlling the vehicle behaviors since it can accurately detect a road sign such as a lane mark by processing a color image of the road in front of a vehicle.

The invention claimed is:

1. A vehicle comprising:
   an imaging means;
   an image capturing means which captures a color image of a road via the imaging means;
   an area extraction means which extracts areas having a similar color feature value from the captured color image of the road captured by the image capturing means;
   a white balance processing means which performs, for each of the extracted areas extracted by the area extraction means, a white balance process of correcting each pixel data in the extracted area so as to reduce the degree of divergence in the level between color components according to a level balance between the color components of the pixel data in the extracted area; and
   a road sign detection means which detects a road sign on the road from the color image subjected to the white balance process.

2. A vehicle according to claim 1, wherein:
   the color components of each pixel data of the color image consist of R, G, and B values; and
   the white balance processing means performs processing of multiplying the R value by a first correction factor calculated based on a ratio between a general level of the R value in the extracted area and a general level of a luminance value calculated from the color components in the extracted area, multiplying the G value by a second correction factor calculated based on a ratio between a general level of the G value in the extracted area and a general level of the luminance value calculated from the color components in the extracted area, and multiplying the B value by a third correction factor calculated based on a ratio between a general level of the B value in the extracted area and a general level of the luminance value calculated from the color components in the extracted area for each pixel data in the extracted area in the white balance process.

3. A vehicle according to claim 2, wherein:
   the white balance processing means uses a sum value of R values of all pixels in the extracted area as the general level of the R value in the extracted area and uses a sum value of luminance values of all pixels in the extracted area as the general level of the luminance value calculated from the color components in the extracted area in the case where calculating the first correction factor;
   the white balance processing means uses a sum value of G values of all pixels in the extracted area as the general level of the G value in the extracted area and uses a sum value of luminance values of all pixels in the extracted area as the general level of the luminance value calculated from the color components in the extracted area in the case where calculating the second correction factor; and
   the white balance processing means uses a sum value of B values of all pixels in the extracted area as the general level of the B value in the extracted area and uses a sum value of luminance values of all pixels in the extracted area as the general level of the luminance value calculated from the color components in the extracted area in the case where calculating the third correction factor.

4. A vehicle according to claim 2, wherein:
   the white balance processing means uses a mean value of R values of all pixels in the extracted area as the general level of the R value in the extracted area and uses a mean value of luminance values of all pixels in the extracted area as the general level of the luminance value calculated from the color components in the extracted area in the case where calculating the first correction factor;
   the white balance processing means uses a mean value of G values of all pixels in the extracted area as the general level of the G value in the extracted area and uses a mean value of luminance values of all pixels in the extracted area as the general level of the luminance value calculated from the color components in the extracted area in the case where calculating the second correction factor; and
   the white balance processing means uses a mean value of B values of all pixels in the extracted area as the general level of the B value in the extracted area and uses a mean value of luminance values of all pixels in the extracted area as the general level of the luminance value calculated from the color components in the extracted area in the case where calculating the third correction factor.

5. A vehicle comprising:
   an imaging means;
   an image capturing means which captures a color image of a road via the imaging means;
   an area extraction means which extracts areas having a similar color feature value from the captured color image of the road captured by the image capturing means;
   a road range specifying means which specifies a road range that the road occupies in the color image;
   a white balance processing means which performs, for each of the extracted areas extracted by the area extraction means, a white balance process of correcting each pixel data in the extracted area so as to reduce the degree of divergence in the level between color components according to a level balance between the color components of the pixel data in the road range of the extracted area; and
   a road sign detection means which detects a road sign on the road from the color image subjected to the white balance process.

6. A vehicle according to claim 5, wherein:
   the color components of each pixel data of the color image consist of R, G, and B values; and
   the white balance processing means performs processing of multiplying the R value by a first correction factor calculated based on a ratio between a general level of the R value in the road range of the extracted area and a general level of a luminance value calculated from the color components in the road range of the extracted area, multiplying the G value by a second correction factor calculated based on a ratio between a general level of the G value in the road range of the extracted area and a general level of the luminance value calculated from the color components in the road range of the extracted area, and multiplying the B value by a third correction factor calculated based on a ratio between a general level of the B value in the road range of the extracted area and a general level of the luminance value calculated from the color components in the road range of the extracted area for each pixel data in the extracted area in the white balance process.

7. A vehicle according to claim 6, wherein:
   the white balance processing means uses a sum value of R values of all pixels in the road range of the extracted area as the general level of the R value in the road range of the extracted area and uses a sum value of luminance values of all pixels in the road range of the extracted area as the general level of the luminance value calculated from the color components in the road range of the extracted area in the case where calculating the first correction factor;

the white balance processing means uses a sum value of G values of all pixels in the road range of the extracted area as the general level of the G value in the road range of the extracted area and uses a sum value of luminance values of all pixels in the road range of the extracted area as the general level of the luminance value calculated from the color components in the road range of the extracted area in the case where calculating the second correction factor; and the white balance processing means uses a sum value of B values of all pixels in the road range of the extracted area as the general level of the B value in the road range of the extracted area and uses a sum value of luminance values of all pixels in the road range of the extracted area as the general level of the luminance value calculated from the color components in the road range of the extracted area in the case where calculating the third correction factor.

8. A vehicle according to claim 6, wherein:

the white balance processing means uses a mean value of R values of all pixels in the road range of the extracted area as the general level of the R value in the road range of the extracted area and uses a mean value of luminance values of all pixels in the road range of the extracted area as the general level of the luminance value calculated from the color components in the road range of the extracted area in the case where calculating the first correction factor;

the white balance processing means uses a mean value of G values of all pixels in the road range of the extracted area as the general level of the G value in the road range of the extracted area and uses a mean value of luminance values of all pixels in the road range of the extracted area as the general level of the luminance value calculated from the color components in the road range of the extracted area in the case where calculating the second correction factor; and the white balance processing means uses a mean value of B values of all pixels in the road range of the extracted area as the general level of the B value in the road range of the extracted area and uses a mean value of luminance values of all pixels in the road range of the extracted area as the general level of the luminance value calculated from the color components in the road range of the extracted area in the case where calculating the third correction factor.

9. A road sign recognition device comprising:

an image capturing means which captures a color image of a road via an imaging means;

an area extraction means which extracts areas having a similar color feature value from the captured color image of the road captured by the image capturing means;

a white balance processing means which performs, for each of the extracted areas extracted by the area extraction means, a white balance process of correcting each pixel data in the extracted area so as to reduce the degree of divergence in the level between color components according to a level balance between the color components of the pixel data in the extracted area; and a road sign detection means which detects a road sign on the road from the color image subjected to the white balance process.

10. A road sign recognition device according to claim 9, wherein:

the color components of each pixel data of the color image consist of R, G, and B values; and the white balance processing means performs processing of multiplying the R value by a first correction factor calculated based on a ratio between a general level of the R value in the extracted area and a general level of a luminance value calculated from the color components in the extracted area, multiplying the G value by a second correction factor calculated based on a ratio between a general level of the G value in the extracted area and a general level of the luminance value calculated from the color components in the extracted area, and multiplying the B value by a third correction factor calculated based on a ratio between a general level of the B value in the extracted area and a general level of the luminance value calculated from the color components in the extracted area for each pixel data in the extracted area in the white balance process.

11. A road sign recognition device according to claim 10, wherein:

the white balance processing means uses a sum value of R values of all pixels in the extracted area as the general level of the R value in the extracted area and uses a sum value of luminance values of all pixels in the extracted area as the general level of the luminance value calculated from the color components in the extracted area in the case where calculating the first correction factor;

the white balance processing means uses a sum value of G values of all pixels in the extracted area as the general level of the G value in the extracted area and uses a sum value of luminance values of all pixels in the extracted area as the general level of the luminance value calculated from the color components in the extracted area in the case where calculating the second correction factor; and the white balance processing means uses a sum value of B values of all pixels in the extracted area as the general level of the B value in the extracted area and uses a sum value of luminance values of all pixels in the extracted area as the general level of the luminance value calculated from the color components in the extracted area in the case where calculating the third correction factor.

12. A road sign recognition device according to claim 10, wherein:

the white balance processing means uses a mean value of R values of all pixels in the extracted area as the general level of the R value in the extracted area and uses a mean value of luminance values of all pixels in the extracted area as the general level of the luminance value calculated from the color components in the extracted area in the case where calculating the first correction factor;

the white balance processing means uses a mean value of G values of all pixels in the extracted area as the general level of the G value in the extracted area and uses a mean value of luminance values of all pixels in the extracted area as the general level of the luminance value calculated from the color components in the extracted area in the case where calculating the second correction factor; and the white balance processing means uses a mean value of B values of all pixels in the extracted area as the general level of the B value in the extracted area and uses a mean value of luminance values of all pixels in the extracted area as the general level of the luminance value calculated from the color components in the extracted area in the case where calculating the third correction factor.

13. A road sign recognition device comprising:
an image capturing means which captures a color image of a road via an imaging means;
an area extraction means which extracts areas having a similar color feature value from the captured color image of the road captured by the image capturing means;
a road range specifying means which specifies a road range that the road occupies in the color image;
a white balance processing means which performs, for each of the extracted areas extracted by the area extraction means, a white balance process of correcting each pixel data in the extracted area so as to reduce the degree of divergence in the level between color components according to a level balance between the color components of the pixel data in road range of the extracted area; and
a road sign detection means which detects a road sign on the road from the color image subjected to the white balance process.

14. A road sign recognition device according to claim 13, wherein:
the color components of each pixel data of the color image consist of R, G, and B values; and
the white balance processing means performs processing of multiplying the R value by a first correction factor calculated based on a ratio between a general level of the R value in the road range of the extracted area and a general level of a luminance value calculated from the color components in the road range of the extracted area, multiplying the G value by a second correction factor calculated based on a ratio between a general level of the G value in the road range of the extracted area and a general level of the luminance value calculated from the color components in the road range of the extracted area, and multiplying the B value by a third correction factor calculated based on a ratio between a general level of the B value in the road range of the extracted area and a general level of the luminance value calculated from the color components in the road range of the extracted area for each pixel data in the extracted area in the white balance process.

15. A road sign recognition device according to claim 14, wherein:
the white balance processing means uses a sum value of R values of all pixels in the road range of the extracted area as the general level of the R value in the road range of the extracted area and uses a sum value of luminance values of all pixels in the road range of the extracted area as the general level of the luminance value calculated from the color components in the road range of the extracted area in the case where calculating the first correction factor;
the white balance processing means uses a sum value of G values of all pixels in the road range of the extracted area as the general level of the G value in the road range of the extracted area and uses a sum value of luminance values of all pixels in the road range of the extracted area as the general level of the luminance value calculated from the color components in the road range of the extracted area in the case where calculating the second correction factor; and
the white balance processing means uses a sum value of B values of all pixels in the road range of the extracted area as the general level of the B value in the road range of the extracted area and uses a sum value of luminance values of all pixels in the road range of the extracted area as the general level of the luminance value calculated from the color components in the road range of the extracted area in the case where calculating the third correction factor.

16. A road sign recognition device according to claim 14, wherein:
the white balance processing means uses a mean value of R values of all pixels in the road range of the extracted area as the general level of the R value in the road range of the extracted area and uses a mean value of luminance values of all pixels in the road range of the extracted area as the general level of the luminance value calculated from the color components in the road range of the extracted area in the case where calculating the first correction factor;
the white balance processing means uses a mean value of G values of all pixels in the road range of the extracted area as the general level of the G value in the road range of the extracted area and uses a mean value of luminance values of all pixels in the road range of the extracted area as the general level of the luminance value calculated from the color components in the road range of the extracted area in the case where calculating the second correction factor; and
the white balance processing means uses a mean value of B values of all pixels in the road range of the extracted area as the general level of the B value in the road range of the extracted area and uses a mean value of luminance values of all pixels in the road range of the extracted area as the general level of the luminance value calculated from the color components in the road range of the extracted area in the case where calculating the third correction factor.

* * * * *